US012437593B1

(12) United States Patent
Minsley et al.

(10) Patent No.: US 12,437,593 B1
(45) Date of Patent: Oct. 7, 2025

(54) CONTROLLED ACCESS SYSTEM, DEVICE AND METHOD

(71) Applicant: DAVINCI LOCK LLC, Raleigh, NC (US)

(72) Inventors: Bradford A. Minsley, Raleigh, NC (US); Clifton P. Minsley, Raleigh, NC (US)

(73) Assignee: DAVINCI LOCK LLC, Raleigh, NC (US)

( * ) Notice: Subject to any disclaimer, the term of this patent is extended or adjusted under 35 U.S.C. 154(b) by 0 days.

(21) Appl. No.: 18/986,986

(22) Filed: Dec. 19, 2024

(51) Int. Cl.
*G07C 9/10* (2020.01)
*G07C 9/27* (2020.01)

(52) U.S. Cl.
CPC *G07C 9/10* (2020.01); *G07C 9/27* (2020.01)

(58) Field of Classification Search
CPC .................................... G07C 9/10; G07C 9/27
See application file for complete search history.

(56) References Cited

U.S. PATENT DOCUMENTS

| | | | |
|---|---|---|---|
| 4,870,400 | A | 9/1989 | Downs et al. |
| 5,964,110 | A | 10/1999 | Crocco et al. |
| 7,047,773 | B1 | 5/2006 | Lin |
| 7,236,085 | B1 | 6/2007 | Aronson et al. |
| 8,108,927 | B2 | 1/2012 | Michelle et al. |
| 8,774,714 | B2 | 7/2014 | Metivier |
| 9,373,201 | B2 | 6/2016 | Jefferies et al. |
| 9,464,460 | B2 | 10/2016 | Lai |
| 9,524,600 | B2 | 12/2016 | Yong et al. |
| 9,908,697 | B2 | 3/2018 | De Roquette Buisson et al. |
| 10,089,811 | B2 | 10/2018 | Ufkes |
| 10,124,765 | B2 | 11/2018 | Wilt et al. |
| 10,242,402 | B1 | 3/2019 | Soccorsy et al. |
| 10,475,115 | B2 | 11/2019 | Minsley et al. |
| 10,614,646 | B1 | 4/2020 | Douglass et al. |
| 10,614,650 | B2 | 4/2020 | Minsley et al. |
| 10,733,681 | B2 | 8/2020 | Boss et al. |
| 10,922,747 | B2 | 2/2021 | Minsley et al. |

(Continued)

FOREIGN PATENT DOCUMENTS

| | | |
|---|---|---|
| CN | 111599048 | 8/2020 |
| EP | 2799646 | 11/2014 |
| WO | 2012047850 | 4/2012 |

OTHER PUBLICATIONS

Defendant's Answer to Second Amended Complaint and Counterclaim, *DaVinci Lock, LLC* v. *SpiderDoor, LLC*, Civil Action No. 2:23-cv-00343-NAD, U.S. District Court for the Northern District of Alabama, Jul. 19, 2023.

(Continued)

*Primary Examiner* — Nabil H Syed
(74) *Attorney, Agent, or Firm* — Williams Mullen; Thomas F. Bergert

(57) ABSTRACT

Embodiments of a system, device and method employ a mobile application and/or hardware components to obviate reliance on a facility management system to open an access barrier such as a gate. In various embodiments, a hardware device coupled with a mobile application can open an access barrier at an access-controlled property on behalf of individuals. Embodiments of the hardware device include a microprocessor, a cellular hat, and a relay and embodiments of the system can incorporate a gate motor controller.

11 Claims, 6 Drawing Sheets

(56) References Cited

U.S. PATENT DOCUMENTS

| | | | | |
|---|---|---|---|---|
| 11,094,152 | B2 | 8/2021 | Minsley et al. | |
| 11,232,513 | B2 | 1/2022 | Minsley et al. | |
| 11,348,389 | B1 | 5/2022 | Kushnir | |
| 11,416,919 | B2 | 8/2022 | Minsley et al. | |
| 11,538,098 | B2 | 12/2022 | Minsley et al. | |
| 11,663,650 | B2 | 5/2023 | Minsley et al. | |
| 12,014,294 | B2 | 6/2024 | Minsley et al. | |
| 12,125,327 | B1 | 10/2024 | Minsley et al. | |
| 12,131,373 | B2 | 10/2024 | Minsley et al. | |
| 12,131,602 | B1 | 10/2024 | Minsley et al. | |
| 2002/0034303 | A1 * | 3/2002 | Farris | H04L 9/3226 380/270 |
| 2002/0059114 | A1 | 5/2002 | Cockrill et al. | |
| 2003/0061192 | A1 | 3/2003 | McGunn et al. | |
| 2003/0208647 | A1 | 11/2003 | Kumar et al. | |
| 2004/0030934 | A1 | 2/2004 | Mizoguchi et al. | |
| 2005/0154605 | A1 | 7/2005 | Tropp | |
| 2005/0216673 | A1 | 9/2005 | Kumar et al. | |
| 2005/0237149 | A1 | 10/2005 | Loftin et al. | |
| 2005/0241003 | A1 | 10/2005 | Sweeney et al. | |
| 2007/0145126 | A1 | 6/2007 | Erlank et al. | |
| 2007/0214369 | A1 | 9/2007 | Roberts et al. | |
| 2007/0219928 | A1 * | 9/2007 | Madhogarhia | G06F 21/32 705/75 |
| 2008/0246583 | A1 | 10/2008 | Blake et al. | |
| 2009/0083851 | A1 | 3/2009 | Michelle et al. | |
| 2009/0256676 | A1 | 10/2009 | Piccirillo et al. | |
| 2009/0328203 | A1 | 12/2009 | Haas | |
| 2012/0102551 | A1 | 4/2012 | Bidare | |
| 2012/0169461 | A1 | 7/2012 | Dubois, Jr. | |
| 2012/0280790 | A1 * | 11/2012 | Gerhardt | G07C 9/00309 340/5.61 |
| 2013/0024528 | A1 | 1/2013 | Gallant et al. | |
| 2013/0139408 | A1 | 6/2013 | Chaiken | |
| 2013/0254122 | A1 | 9/2013 | Mullin et al. | |
| 2013/0335193 | A1 | 12/2013 | Hanson et al. | |
| 2014/0028443 | A1 | 1/2014 | Ebner | |
| 2014/0062656 | A1 | 3/2014 | Bowen et al. | |
| 2014/0207499 | A1 | 7/2014 | Fliess et al. | |
| 2014/0207657 | A1 | 7/2014 | Gacs | |
| 2014/0266585 | A1 | 9/2014 | Chao et al. | |
| 2014/0309842 | A1 | 10/2014 | Jefferies et al. | |
| 2015/0077223 | A1 | 3/2015 | Pipes | |
| 2015/0078137 | A1 | 3/2015 | Lee et al. | |
| 2015/0186840 | A1 | 7/2015 | Torres et al. | |
| 2015/0199859 | A1 | 7/2015 | Ouyang et al. | |
| 2015/0199863 | A1 | 7/2015 | Scoggins et al. | |
| 2015/0254760 | A1 | 9/2015 | Pepper | |
| 2015/0356801 | A1 | 12/2015 | Nitu et al. | |
| 2016/0063235 | A1 | 3/2016 | Tussy | |
| 2016/0098990 | A1 | 4/2016 | Berke et al. | |
| 2016/0100309 | A1 | 4/2016 | Velusamy | |
| 2016/0155293 | A1 | 6/2016 | Reaves et al. | |
| 2016/0173595 | A1 | 6/2016 | Miller et al. | |
| 2017/0161978 | A1 | 6/2017 | Wishne | |
| 2017/0236352 | A1 | 8/2017 | Conrad et al. | |
| 2018/0115595 | A1 | 4/2018 | Krishnan et al. | |
| 2018/0216364 | A1 | 8/2018 | Wind et al. | |
| 2018/0230713 | A1 | 8/2018 | Sidhu et al. | |
| 2018/0232976 | A1 * | 8/2018 | Schoenfelder | H04L 63/08 |
| 2018/0253786 | A1 | 9/2018 | Frisby et al. | |
| 2018/0350170 | A1 | 12/2018 | Wang et al. | |
| 2019/0235644 | A1 | 8/2019 | Chen et al. | |
| 2019/0259232 | A1 | 8/2019 | Nandakumar | |
| 2019/0351871 | A1 | 11/2019 | Kim | |
| 2019/0371101 | A1 | 12/2019 | Friedli | |
| 2020/0190854 | A1 | 6/2020 | Tropp | |
| 2020/0318389 | A1 | 10/2020 | Luo | |
| 2020/0378155 | A1 | 12/2020 | Zhang et al. | |
| 2021/0279985 | A1 * | 9/2021 | Igein | B65D 55/02 |
| 2021/0329447 | A1 * | 10/2021 | Varghese | H04W 4/14 |
| 2022/0076514 | A1 | 3/2022 | Lingala et al. | |
| 2022/0101423 | A1 | 3/2022 | Minsley et al. | |
| 2022/0343416 | A1 | 10/2022 | Minsley et al. | |
| 2023/0096650 | A1 | 3/2023 | Minsley et al. | |
| 2024/0028688 | A1 | 1/2024 | Shen | |

OTHER PUBLICATIONS

Plaintiffs' Reply in Support of Their Motion for Preliminary Injunction, *DaVinci Lock, LLC* v. *SpiderDoor, LLC*, Civil Action No. 2:23-cv-00343-CLM, U.S. District Court for the Northern District of Alabama, Aug. 1, 2023.

Defendant's Opposition to Amended Motion for Preliminary Injunction, *DaVinci Lock, LLC* v. *SpiderDoor, LLC*, Civil Action No. 2:23-cv-00343-NAD, U.S. District Court for the Northern District of Alabama, Jul. 14, 2023.

Order, *DaVinci Lock, LLC* v. *SpiderDoor, LLC*, Civil Action No. 2:23-cv-00343-CLM, U.S. District Court for the Northern District of Alabama, Jan. 4, 2024.

Hung et al., "A Door Lock System with Augmented Reality Technology", 2017 IEE 6th Global Conference on Consumer Electronics (GCCE 2017).

* cited by examiner

CONTROLLED ACCESS SYSTEM, DEVICE AND METHOD

TECHNICAL FIELD

The present disclosure pertains to automated gate openers, and more particularly to systems, devices and methods for monitoring and controlling a gate.

BACKGROUND AND SUMMARY

Past and current gate opening systems typically rely on a facility management system to open the gate system. This is problematic because some facility management systems do not have the ability to open the gate directly, thus not permitting access control through a mobile device and/or mobile device application, for example.

Nearly all past and current gate opening systems rely on a code such as a four-digit code and a keypad to open the gate as the default option. In this use case, the facility management system delivers the four-digit unlock codes unique to each tenant to a gate opener microcontroller at the access-controlled property. The facility management system can also deliver an account status for each tenant to the gate opener microcontroller in the form of a flag to grant or deny access to the tenant depending upon the tenant's account status. The facility management system can update the registry every few minutes.

Upon arriving at the facility, the tenant enters his or her unique four-digit code at a keypad at the facility. The microcontroller performs a lookup function to see if the four-digit code is in its registry and if the flag associated with the four-digit code grants access. If yes, then the microcontroller fires a relay to open the gate.

One of the major problems with a four-digit code is that tenants often use their birth year or something very predictable for their code. In the event a birth year is used, a nefarious actor can generally guess a working code within thirty attempts, thereby easily bypassing the vehicle gate.

According to various embodiments of the present disclosure, a system employs a mobile application and backend processing to obviate reliance on a facility management system to open a gate. In embodiments as disclosed herein, a gate opener access tool triggers the gate to open. Further, embodiments of the present system do not rely on any four-digit codes and instead can authenticate the tenant by short message service (SMS) which is wholly unique to that tenant and not easily defeated.

In various embodiments, the system as described herein can include a hardware device coupled and/or a mobile application that can open a vehicle gate at an access-controlled property on behalf of individuals that are i) tenants of the property, and ii) not delinquent with respect to their account balance. In various embodiments, the system can also operate on behalf of individuals who may not be tenants but who may be approved for access by a current tenant. It will be appreciated that embodiments the presently described system, device and method can be employed in a retrofit scenario so as to enable existing vehicle gate motors to operate as described herein as long as such motors have electrical power and cellular coverage. It will further be appreciated that embodiments of the present disclosure are equally applicable to doors and other structures that may temporarily block or prevent access to an access-controlled location.

DETAILED DESCRIPTION OF EMBODIMENTS

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims. In addition, the present disclosure describes, among other things, a premises management system, device and method. Although embodiments herein are described with respect to their application in certain environments and locations, it is understood that the presently described embodiments can be implemented in any setting where access control may be useful.

It will be appreciated that reference to "a", "an" or other indefinite article in the present disclosure encompasses one or more than one of the described element. Thus, for example, reference to a gate may encompass one or more gates, a communications device may encompass one or more communications devices and so forth. Further, the term "gate" as used herein can encompass a door, a barricade or other physical or electronic structure that may block access to, and may be opened to provide access to, an access-controlled location. Such a gate can be considered an openable access barrier.

Figure 1:
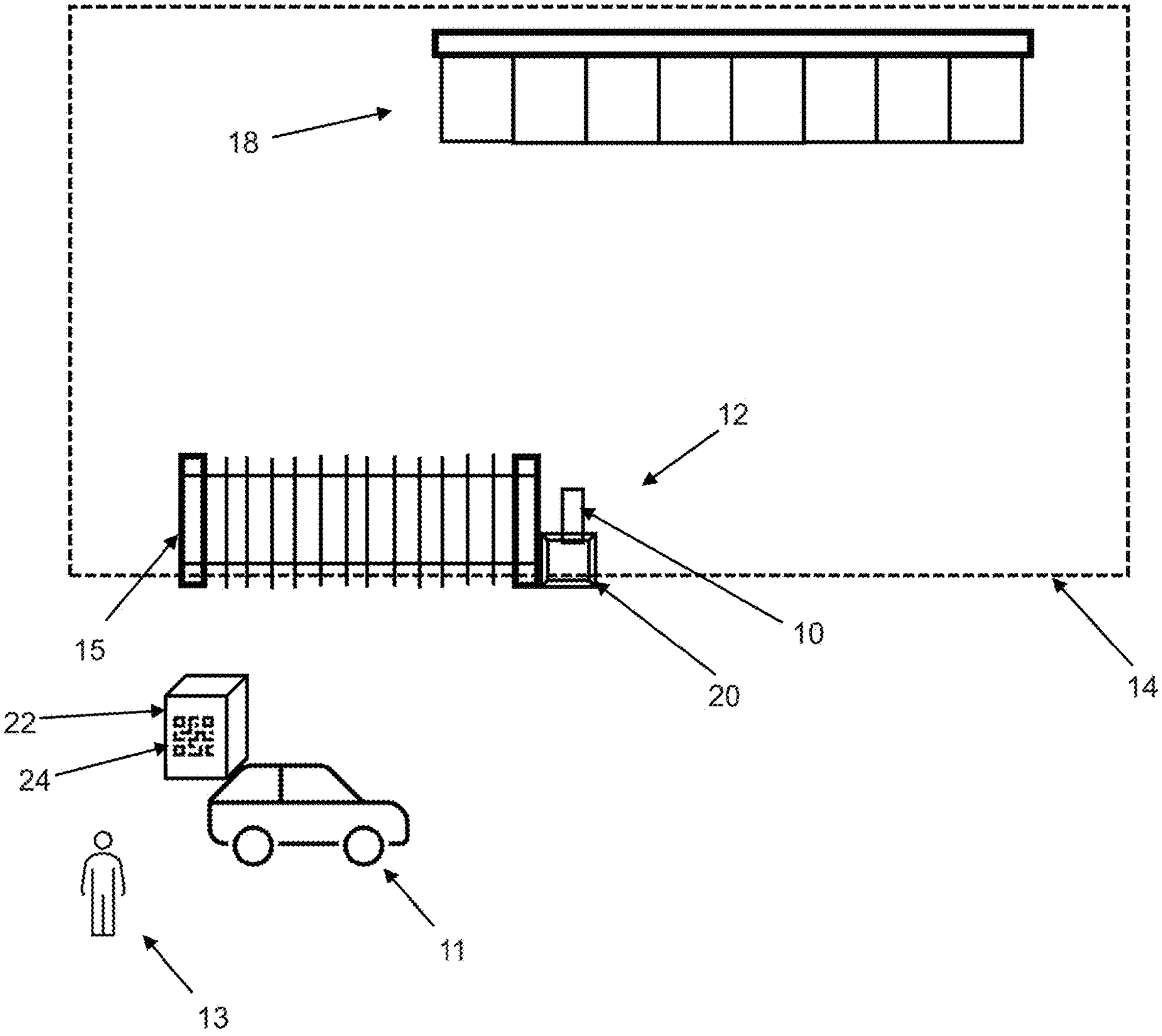
FIG. 1 is a schematic diagram illustrating an environment of use for embodiments of the present disclosure.
Figure 2:
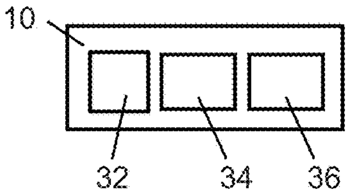
FIG. 2 is a schematic diagram of a device in accordance with embodiments of the present disclosure.

In various embodiments such as shown in FIGS. 1 and 2, a device 10 according to the present disclosure is provided with a microprocessor 32, a cellular hat 34, and a relay 36. The device 10 can be considered a control unit and can draw power such as 12 V DC power from a gate motor 20 that is in communication range with the device 10. The cellular hat 34 is a cellular communication module that can provide data connection for remote, highly localized communications without requiring WiFi or other communications approaches. According to embodiments as described herein, the device's cellular hat 34 can receive a communication such as a short message service (SMS) message from a user's mobile communications device and pass the message to the microprocessor 32, which triggers the relay 36 to be fired. The relay 36 sends current to the vehicle gate motor controller 20 which causes the vehicle gate 15 to be opened or otherwise manipulated to allow access to a user of the mobile device. While the vehicle gate 15 is shown in connection with a self-storage facility premises 14 with a group of self-storage units 18, it will be appreciated that the presently disclosed device 10 and system 12 can operate in other environments such as exemplified elsewhere herein.

It will be appreciated that SMS is an example communication approach that can be employed. For example, other communication approaches in data transmission and data protocol can be employed. Data transmission can be accomplished via cellular technology, wired LAN, WiFi, RF, LoRa, Zigbee, Bluetooth, for example. Data transmission can originate remotely from a service such as Twilio™ sending via SMS, or locally from an RF antenna/transmitter that is connected to the internet or even hyper locally whereby the system leverages the smartphone itself to transmit via Bluetooth or Near Field Communication (NFC). The data protocol can be SMS, Message Queuing Telemetry Transport ("MQTT"), API calls, webhooks, DDS, AMQP, CoAP, WebSocket, XMPP and other protocols, for example.

Figure 3:
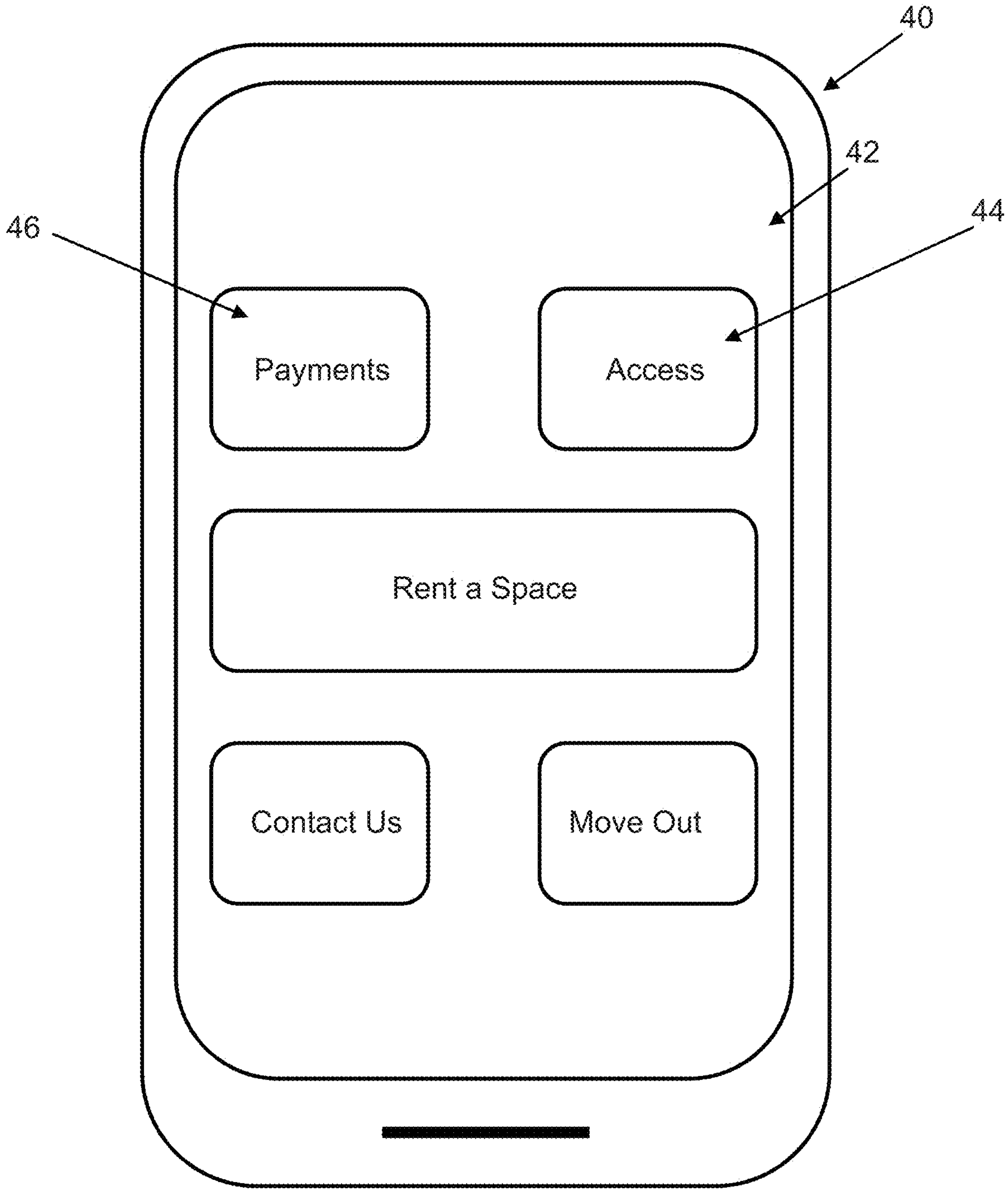
FIGS. 3 and 4 are exemplary user interfaces associated with embodiments of the present disclosure.
Figure 4:
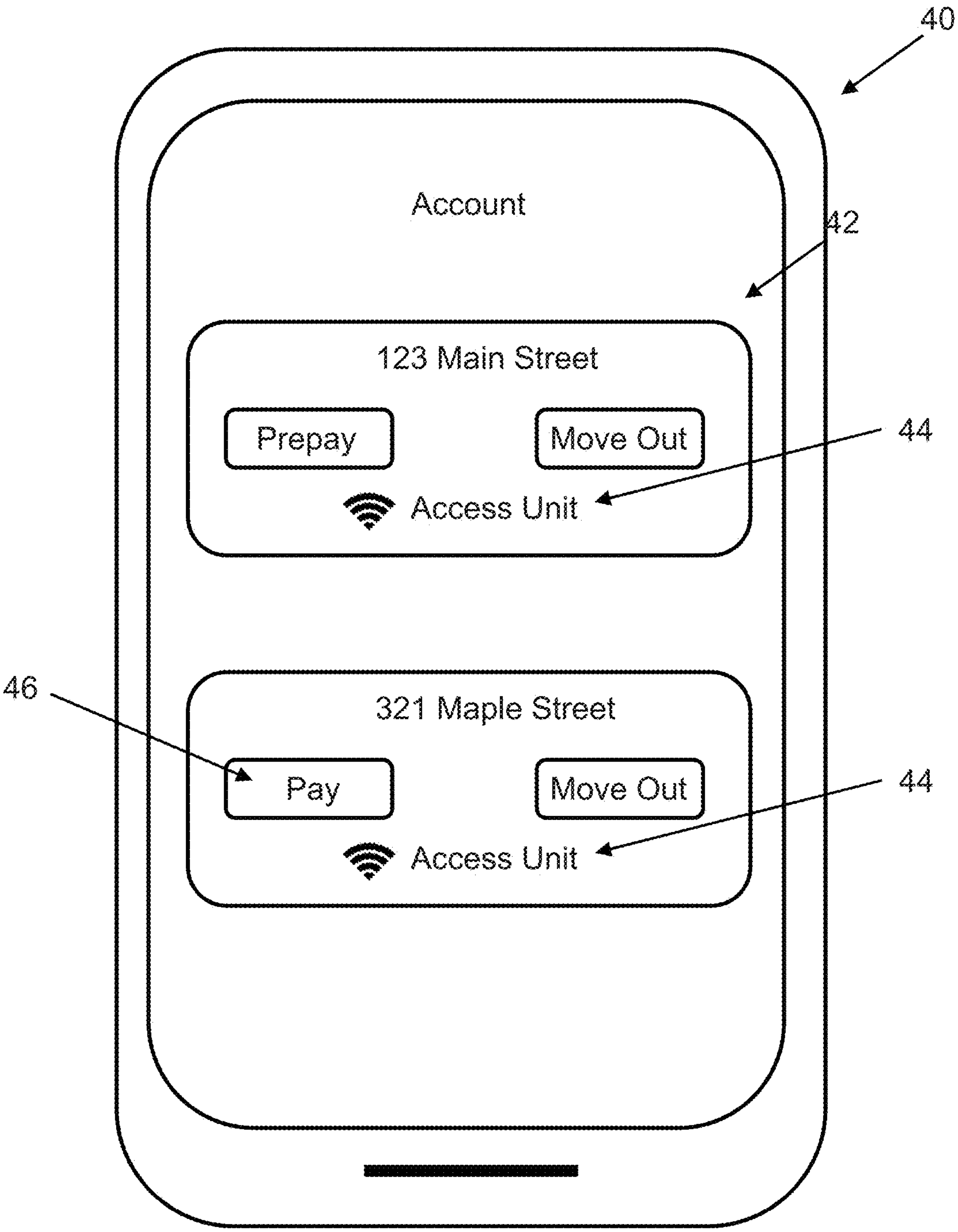

In various embodiments, such as shown in FIGS. 3 and 4, a software application according to the present disclosure can be employed on a mobile communications device 40 such as a smartphone. The application can be opened on a user's mobile communications device and perform functions including: authenticating the user's identity via SMS, determining if the user is in fact a tenant of the facility by querying a facility management system ("FMS"), determining if the user's account balance is in good standing or delinquent by also querying the FMS, and if the above criteria are met, then the application can leverage an SMS service to send an SMS (or equivalent push notification) to the cellular hat 34 of device 10. Using the mobile application, a user can, by way of example and without limitation, pay their bill, open a gate such as gate 15 in FIG. 1, retrieve an unlock code, rent a unit, contact customer support, move out of a rented unit, submit work orders, update user profile information and other actions.

As shown in FIG. 1, for example, a user can visit a facility such as by car 11 or on foot as shown at 13. The user can then scan or read a code 24 such as may be affixed to a structure 22 such as a gate entry post outside of an access-controlled environment (e.g., 14). Upon scanning the code, a mobile application is opened on the user's mobile device (40 in FIGS. 3 and 4). Access to the environment 14 can be managed through direct authentication and/or through code entry procedures according to the present disclosure.

For example, direct authentication can be through text message or single sign-on (SSO) approaches, for example, whereby the mobile application authenticates the user and then the user is able to press a button (e.g., or otherwise engage the system via the mobile application) to send a signal to open the gate. As exemplified in FIGS. 3 and 4, the user may select "access" or "access unit" 44 in the user interface 42 of the mobile application on the mobile device 40. This action sends a message to the device 10, which interacts with the gate controller 20 causing the gate to open as described elsewhere herein. In various embodiments, the mobile application can check to ensure the tenant's account is current and not delinquent and optionally require payment on a delinquent account before enabling the "access unit" icon or button on the application. Such payment can be initiated through the user interface such as by selecting the "Payments" or "Pay" option 46 in FIGS. 3 and 4, for example. It will be appreciated that a user may have an account associated with more than one access-controlled location and may therefore find it necessary to select payment and/or access to a unit within a menu of options for the multiple units associated with the user's account, such as shown in interface 42 of FIG. 4.

In some instances, the user seeking access may not be the primary contact for a unit and therefore not capable of authentication via SSO nor text. In such an instance, the user may be able to enter an entry code associated with the unit they are trying to access. In this instance, the mobile application may present an interface that mimics a physical keypad at the property but with particular functionality. For example, prior to allowing the user to enter an entry code, the mobile application can authenticate the user's cell phone number so there is an immutable record of who entered the entry code. This may be accomplished by simply having the user enter their mobile phone number into the mobile application, then receiving an authentication code via text message that the user can then enter back into the mobile application to prove the user is using a valid mobile phone number. The user's mobile phone number can then be recorded by the microprocessor 32 of device 10 and logged with the entry code attempt as discussed hereinafter.

It is understood that most physical keypads are ten-digit keypads requiring numeric entry codes that are typically four digits in length. According to embodiments of the present disclosure, using the mobile device's interface as a keypad permits the use of the entire alphanumeric system for entry codes, thereby providing exponentially more entry code possibilities and making the risk of a nefarious actor correctly guessing a user's entry code to be much lower. In various embodiments, even if a valid entry code is entered, a user can be presented with a slightly obscured multiple-choice selection of attributes of which only one is the correct one as a further level of security. For example, if the primary account holder is John David, then the user could be presented with multiple choices such as Jxxx Dxvid, Bxxx Minxxy, Gxxx Hxxyth, Axxrew Cxxxnos, for example. If the user selects the wrong answer, then access can be denied, whereas if the user selects the correct answer, access can be granted. Other safeguards can be employed, such as locking a user out when the user enters multiple wrong guesses of the entry code, for example. In various embodiments, since the system can obtain the user's mobile telephone number during operation, the system can lock out a user of such mobile device permanently so as to deter future uses of the same device to try to guess an entry code.

In various embodiments, the microprocessor 32 is a Raspberry Pi™ device and the device 10 can be provided with a weatherproof container for protection from the elements when installed. The device 10 can be affixed to a gate motor controller 20 at an access-controlled premises as described elsewhere herein and the device can draw power from the gate motor controller 20. In various embodiments, the microprocessor 32 can continuously run a script listening for SMS text messages received by the cellular hat 34. When an SMS is received from a specific originating phone number or containing a special message, the script can fire the relay 36 which would provide appropriate current to the gate motor controller 20 to activate its sequence to open and close the gate 15. Various gate motor controllers can be employed, including a gate motor controller fixed at a base of a gate 15 where it can actuate a chain via a sprocket to pull the gate open and closed, for example. The device 10 can be connected to the gate motor controller 20 using suitable wiring, for example.

In various embodiments, a system according to the present disclosure can be a hardware-software system that allows for a tenant to open a vehicle gate from their mobile communication device. According to certain embodiments, the tenant can use his or her mobile communication device to scan a code such as a quick-response (QR) code at an access-controlled area, such as where a gate controls access to a restricted area, for example.

Figure 5:
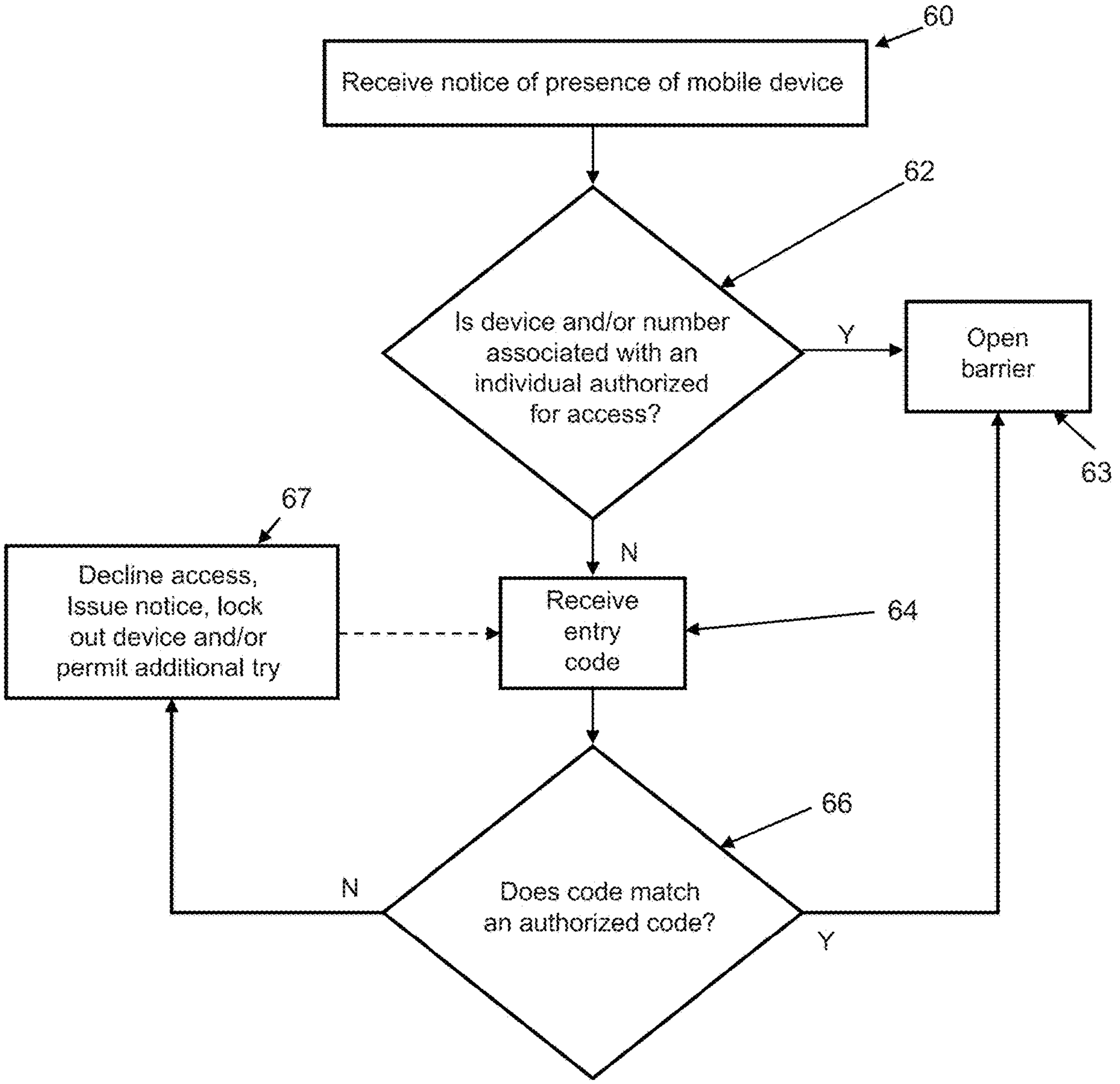
FIGS. 5 and 6 are exemplary flow diagrams associated with embodiments of the present disclosure.
Figure 6:
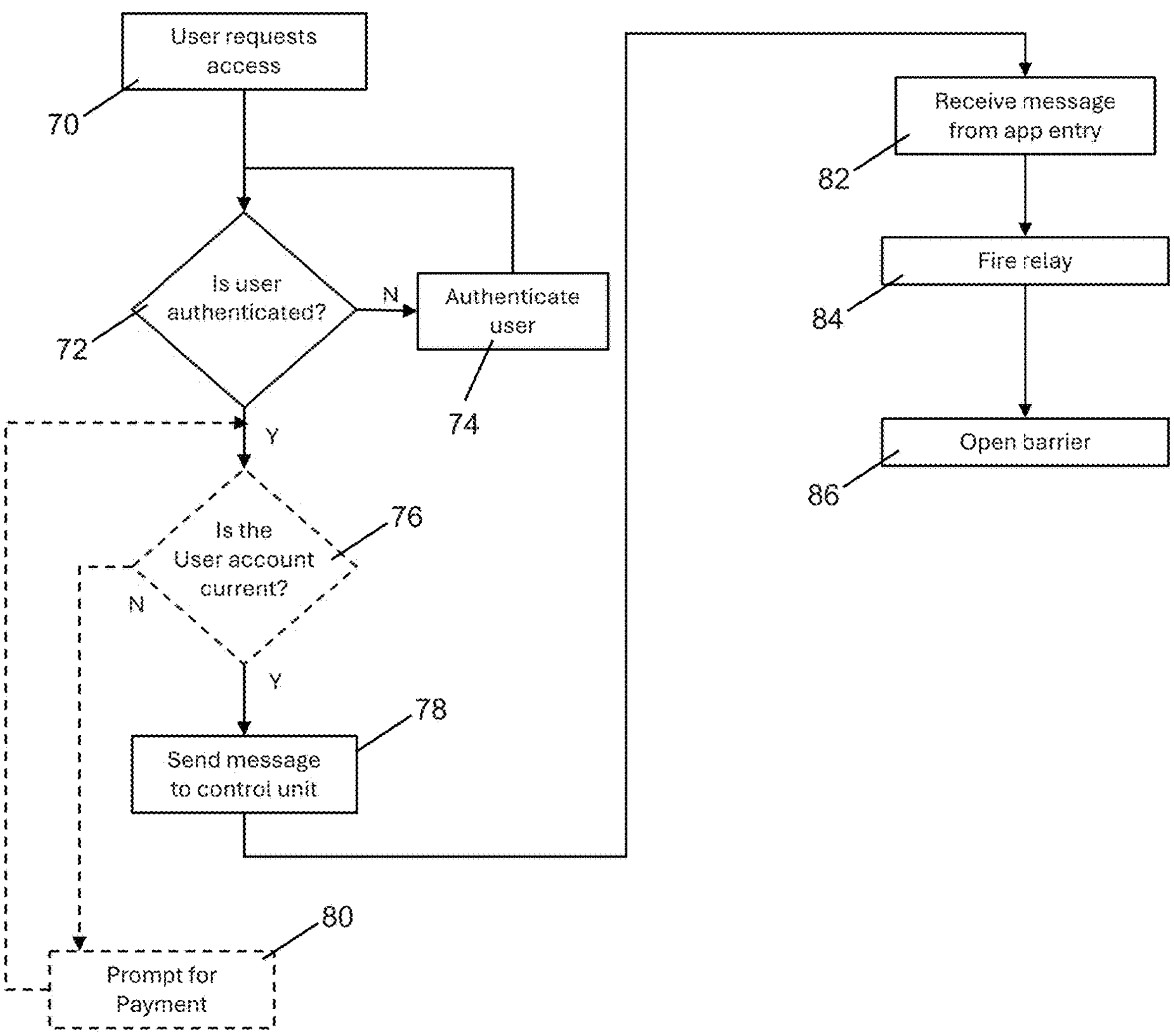
Figure 7:
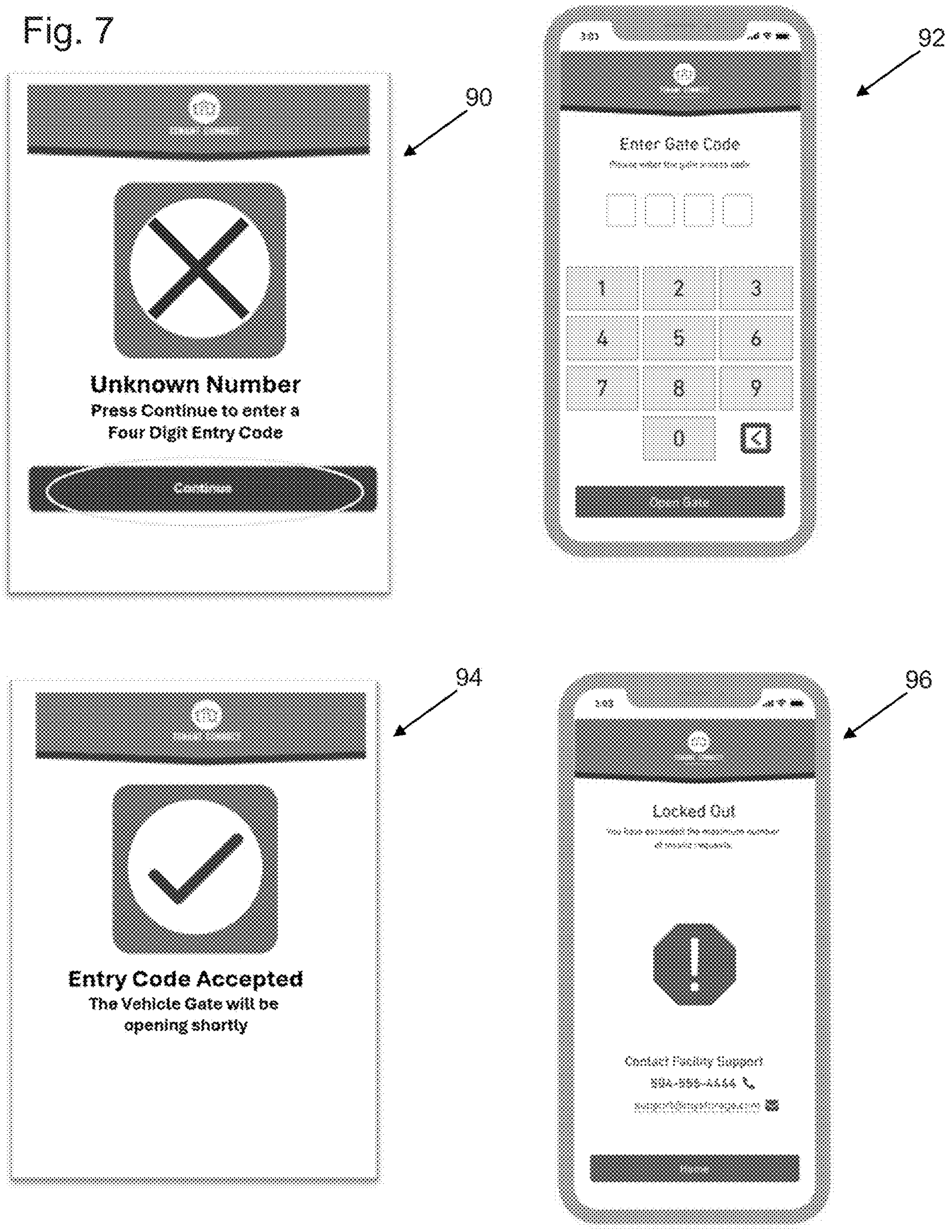
FIG. 7 shows various exemplary user interfaces in accordance with embodiments of the present disclosure.

FIGS. 5 through 7 are exemplary diagrams associated with embodiments of the present disclosure. As shown at 60 in FIG. 5, the presence of a mobile device can be detected, such as when a user employs a mobile communications device to scan or read a code at an access-controlled facility. An access gate, system or device can receive notice of the presence of a mobile device, for example. In various embodiments, scanning or reading the code can result in a web application being opened on the user's mobile device. The web application may know the location of the gate due to the code that was scanned or read, or optionally may know the location of the gate by geolocating the user via the user's device when the user scanned the code. Knowing the location can assist the web application in identifying the correct gate among a group of gates that may potentially be managed using the same web application, for example. In various alternative embodiments, a system such as Apple Wallet™ can provide a pop up when a user's device is within range of a gate as will be understood to those of skill in the art. Returning to FIG. 5, as at 62, it is determined whether the mobile device and/or the phone number of the mobile device is associated with an individual authorized to access the restricted area. This can occur, for example, through direct authentication and/or through code entry procedures as described elsewhere in the present disclosure. This can also occur, for example, when the mobile device being employed is recognized as being associated with the primary authorized user or the user's account, such as through recognition that the mobile device number is associated with a unit in the facility, for example. In various embodiments, the system is operable to confirm that the account associated with the mobile device number is in good standing and not delinquent on payment prior to manipulating the access barrier to allow entrance. In various embodiments, once the detected mobile device is confirmed to be associated with an account and/or unit, a signal is sent to manipulate the access barrier to allow entrance. Such action can occur automatically upon receiving notice of a detected mobile device or after sending a confirmation code to the mobile device (such as by SMS message, for example) and receiving the confirmation code back once entered on a mobile device application in communication with the access-controlled facility. Regardless, once it is determined that the device and/or number is associated with an individual authorized for access, as at 62, the barrier is opened as at 63.

If the mobile device and/or number is determined not to be associated with an individual authorized for access, at 62, an entry code can be received from the mobile device as at 64. As an example, a relative of an account holder may have received the entry code from the account holder and have items that need to be stored at the access-controlled facility. In such instances, as described elsewhere herein, the user (e.g., relative of the account holder) can enter his or her mobile telephone number, receive and respond to an authentication prompt, and then enter an entry code via an application on the user's mobile communication device. Processing and storage of the information exchanged can be accomplished via the microprocessor 32 of device 10, for example. If the entry code matches an entry code of an authorized individual at the facility involved as determined at 66, the access barrier can be opened and/or otherwise manipulated to allow access to a user of the mobile device as at 63. If the entry code does not match an entry code associated with an authorized individual at the facility, access can be denied, an alert or notification can be issued and/or the device used to try to gain access can be locked out as at 67 and as described elsewhere herein. In embodiments where an alert is issued, such alert can be sent to an email address or phone number of an authorized user, to a facility management system or personnel, and/or to law enforcement. In optional embodiments, the user can be permitted to attempt one or more additional entries of a different code in an effort to obtain access, as indicated by dashed line from 67 to 64 in FIG. 5.

In various embodiments, it will be appreciated that receiving the entry code and determining that the entry code is acceptable can occur in multiple ways. As an example, with reference to FIG. 7, interface 90 indicates that a user of a mobile device has a phone number that is not recognized as being associated with a customer or tenant at that facility. Such a user may be a friend, relative, colleague or acquaintance of a tenant to whom the tenant has separately provided the gate access code. Interface 92 can then be presented as a digital keypad that replicates the functionality of a physical keypad. It will be appreciated that added benefits of the digital keypad over the physical keypad include storing a log of users of the digital keypad indexed by phone number, potentially locking the user out after unsuccessful attempts, and adding an additional layer of protection such as a multiple choice quiz on an attribute of a customer or tenant associated with the entry gate code they entered to try to limit successful guesses, as described elsewhere herein. Interface 94 in FIG. 7 is an exemplary interface that may be provided to the user upon successfully entering an entry code that matches an existing code associated with an authorized user. Interface 96 in FIG. 7 is an exemplary interface that may be provided to the user upon unsuccessfully entering the proper entry code (e.g., entering an entry code that is not associated with an authorized user), which may not appear on the first unsuccessful entry but potentially after more than one unsuccessful efforts, and in such case, the user may be locked out and instructed to contact a facility manager through other means, for example. In various embodiments, the digital keypad is presented via a mobile application operable to identify the location of the mobile device, such as when the mobile device user has consented to the mobile application using geo-location functionality of the mobile device, or when a service such as Apple Wallet™ or an iOS™/Andriod™ app is monitoring the location of the mobile device when the user comes into proximity with the facility, for example. In various embodiments, the interfaces 90, 92, 94, 96 can be presented on the mobile application launched upon scanning the code at the access barrier, for example.

It will further be appreciated that the authorized individual can be the actual user of the mobile device or a different user. For example, the authorized user may be a tenant or renter of a storage unit at a self-storage facility, and the authorized user may have provided contact information, one or more passwords or entry codes and other profile information employed by the self-storage facility and/or an information management system associated with the self-storage facility. The authorized user can then use the entry code to access the facility. On the other hand, as described elsewhere herein, the user of the mobile device need not be the authorized individual but may nonetheless be associated with the authorized individual such that the authorized individual permits such other user to access the access-controlled area. For example, the other user can be a relative or friend of the authorized individual and the other user may have properly obtained an entry code from the authorized individual so as to gain access as desired.

In the exemplary diagram of FIG. 6, as at 70 a user requests access to an access-controlled facility. At 72, it is determined if the user is authenticated, which can occur as described elsewhere herein. If the user is not authenticated yet, the user can be authenticated as at 74. Once the user is authenticated, it is determined whether the user's account is current at 76. If so, a message is sent to the control unit as at 78. The message can be an entry code, for example. If the user's account is not current, the user can be prompted for payment as at 80. It will be appreciated that embodiments of the present disclosure can operate without determining if the user's account is current at 76 and prompting for payment if not, as at 80. As such, these elements are shown in dashed lines in FIG. 6. A proper entry code is received by the control device as at 82. This can occur upon an SMS message being received from a pre-authorized number or containing a pre-authorized message, or upon an associated user being authenticated and providing the entry code as described elsewhere herein. The relay is then fired as at 84 and the barrier is opened as at 86 with variations that may be specific to certain operating environments as described elsewhere herein.

Although the present disclosure may be described in instances with respect to self-storage facilities, it will be appreciated that embodiments of the present disclosure can be implemented in any setting where access control using an openable access barrier such as a gate or door may be useful, such as hotels and/or hotel rooms, apartment buildings, storage containers, short-term housing rentals, lockers and other environments as described herein, for example. In addition, the present disclosure can be implemented within a controlled access system (CAS) with an openable access barrier, such as for equipment rooms, vaults, hospitals, airports, government facilities, nuclear power facilities, water treatment facilities, weapon storage facilities, aircraft cockpits, and any other setting that requires restricted, selective, or monitored access. Environments and/or locations in which embodiments of the present disclosure may operate include, in addition to self-storage facilities, education and membership environments with locks on school lockers and/or sports club lockers, transportation environments with locks on cargo containers, utility environments with locks on natural gas meters, transformer boxes or other physical utility feature, marinas and boat storage environments with locks on boats such as may be used to secure the boats to a dock or a mooring piling, parcel delivery environments where locks are used to secure containers for at-home delivery, shared transport environments such as may be used for temporary use of bikes, scooters, and other forms of transportation, for example.

In certain embodiments in which the system includes a computing device, such as a mobile communications device, a premises management system, a control device, a microcontroller, a microprocessor, a remote server, etc., the computing device is any suitable computing device that includes at least one processor and at least one memory device or data storage device. As further described herein, the computing device includes at least one processor configured to transmit and receive data or signals representing events, messages, commands, or any other suitable information between the computing device and other devices. The processor of the computing device is configured to execute the events, messages, or commands represented by such data or signals in conjunction with the operation of the computing device. Instructions and/or software can be stored in a memory and executed by such processing device.

It will be appreciated that any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing, including a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon. Embodiments of systems according to the present disclosure can be one or a combination of two or more of a control device, a gate motor controller, a mobile communications device, and a premises or facility management device as described herein.

It will be appreciated that all of the disclosed methods and procedures herein can be implemented using one or more computer programs or components. These components may be provided as a series of computer instructions on any conventional computer-readable medium, including RAM, SATA DOM, or other storage media. The instructions may be configured to be executed by one or more processors which, when executing the series of computer instructions, performs or facilitates the performance of all or part of the disclosed methods and procedures.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers and computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on a user's computer, as a stand-alone software package, partly on a user's computer and partly on a remote computer or entirely on the remote computer or server.

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

Although the present approach has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present approach.

The invention claimed is:

1. An access system that controls access to a restricted area, the access system comprising:
- an openable access barrier;
- a processor; and
- a memory storing instructions that when executed by the processor cause the processor to:
  - receive notice of presence of a mobile device;
  - determine whether the mobile device is associated with an individual authorized for access through the barrier;
  - upon the mobile device not being associated with an individual authorized for access through the barrier, receive a mobile phone number from the mobile device and send an authentication code to the mobile phone number;
  - upon authenticating the mobile device, receive an entry code via the mobile device; and
  - manipulate the access barrier to allow access to a user of the mobile device.

2. The access system of claim 1, further comprising a code displayed in proximity to the access barrier, wherein the instructions receive the notice of the presence of the mobile device upon the mobile device scanning the code.

3. The access system of claim 1, further comprising a gate motor controller in communication with the access barrier, wherein the instructions cause the processor to manipulate the access barrier to allow access to the user of the mobile device by causing the processor to signal the gate motor controller to open the access barrier.

4. The access system of claim 3, wherein the gate motor controller comprises a control unit comprising a microprocessor, a cellular hat and a relay.

5. The access system of claim 1, wherein the entry code is received via a digital keypad from a mobile application launched upon receiving the notice of the presence of the mobile device.

6. A computer-implemented method, comprising:
- receiving notice of presence of a mobile device;
- determining whether the mobile device is associated with an individual authorized for access through the barrier;
- upon the mobile device not being associated with an individual authorized for access through the barrier, receiving a mobile phone number from the mobile device and sending an authentication code to the mobile phone number;
- upon authenticating the mobile device, receiving an entry code via the mobile device; and manipulating an access barrier to allow access to a user of the mobile device.

7. The computer-implemented method of claim 6, wherein receiving the notice of the presence of the mobile device occurs via the mobile device scanning a code displayed in proximity to the access barrier.

8. The computer-implemented method of claim 6, wherein manipulating the access barrier to allow access to the user of the mobile device comprises signaling a gate motor controller to open the access barrier.

9. The computer-implemented method of claim 8, wherein the gate motor controller comprises a control unit comprising a microprocessor, a cellular hat and a relay.

10. The computer-implemented method of claim 6, wherein the entry code is received via a digital keypad on a display of the mobile device.

11. The computer-implemented method of claim 10, wherein the digital keypad is presented via a mobile application operable to identify a location of the mobile device.

* * * * *